(12) United States Patent
Carkner et al.

(10) Patent No.: US 7,178,396 B2
(45) Date of Patent: Feb. 20, 2007

(54) ACCOUSTICAL APPARATUS AND METHOD FOR MEASURING WATER LEVEL IN A GROUND WATER WELL HAVING OBSTRUCTIONS

(76) Inventors: Steve Carkner, 107 Lockhart Avenue, Suite B, Ottawa, Ontario (CA) K2A 3R4; Paul Holden, 15 Colchester Square, Kanata, Ontario (CA) K2K 3A1; Jamie Risk, 2487 Falcon Avenue, Ottawa, Ontario (CA) K1V 8C8

( * ) Notice: Subject to any disclaimer, the term of this patent is extended or adjusted under 35 U.S.C. 154(b) by 207 days.

(21) Appl. No.: 10/919,240

(22) Filed: Aug. 17, 2004

(65) Prior Publication Data

US 2006/0037392 A1    Feb. 23, 2006

(51) Int. Cl.
*G01F 23/296* (2006.01)
(52) U.S. Cl. .................................... 73/290 V
(58) Field of Classification Search ............ None
See application file for complete search history.

(56) References Cited

U.S. PATENT DOCUMENTS 4,210,969 A * 7/1980 Massa ................. 367/108
4,934,186 A * 6/1990 McCoy ................. 73/152.58
4,972,386 A * 11/1990 Lau ...................... 367/99
5,319,974 A * 6/1994 Lenz et al. ............ 73/290 V
6,865,137 B2 * 3/2005 Lyon et al. ............ 367/13

* cited by examiner

Primary Examiner—Hezron Williams
Assistant Examiner—Paul M. West
(74) Attorney, Agent, or Firm—J. Gordon Thomson

(57) ABSTRACT

An acoustic distance measuring device adapted to measure the level of water in a ground water well by first emitting a sonic low frequency acoustic pulse and measuring the time-of-flight for each reflected pulse from the surface of the water in the well. Each reflected pulse must have an amplitude greater than a threshold amplitude or it will be rejected. Based on time-of-flight measurements from the first low frequency sonic pulse reception windows are established for a second higher frequency sonic pulse. To refine the time-of-flight measurements for the second pulse only those reflected pulses whose reception times fall within the reception windows are accepted. A more accurate calculation of the distance from the sonic pulse emitter to the surface of the water is accomplished by using the refined time-of-flight measurements from the second higher frequency pulse.

26 Claims, 9 Drawing Sheets

ACCOUSTICAL APPARATUS AND METHOD FOR MEASURING WATER LEVEL IN A GROUND WATER WELL HAVING OBSTRUCTIONS

BACKGROUND OF THE INVENTION

1. Field of the Invention

This invention relates to the field of acoustic devices and methods used for measuring the level of water in a ground water well and more specifically an acoustical device that relies upon an echoing sonic frequency sound wave to reliably determine the level of water in a ground water well that may contain obstructions.

2. Discussion of the Prior Art

The ability to measure the level of water in a ground water well is of significant importance to those individuals who rely upon such wells for their drinking water. The most common requirement is to know the volume of water in the well to determine the inventory of water available for use and to determine appropriate usage rates. Additionally, since ground water wells are sealed from surface water runoff and its contaminants, fluctuations in water levels in ground water wells may be indicative of leakage into the well and subsequent ground water contamination.

Echo systems for through-air measurement of the level of fluid in a container are well known. Typically, such a system includes a transducer that emits a burst of acoustic energy to locate the position of the surface of a fluid in a container such as a storage tank. The level of the fluid within the storage tank is determined based upon the amount of time required for the acoustic energy to travel from the transducer to the surface of the fluid and back again. It has been recognized that there are various practical problems associated with these systems. For example, once such problem is the generation of multiple return signals caused by reflections from the walls of the containers and possible internal structures such as pipes. Multiple return signals will serve to confound the return signal detector as to which return signal is representative of the true fluid level. One attempt to overcome the multiple return signal problem is described in U.S. Pat. No. 5,131,271 "Ultrasonic Level Detector" issued to Haynes and Margison on Jul. 21, 1992. This patent discloses a device having various improved signal processing features that ignores the spurious signals caused by echoes by only accepting an echo having a signal strength exceeding a magnitude exceeding a specified threshold.

The device taught by Haynes and Margison is a system that uses ultrasonic energy and therefore is suitable only for relatively short distances between the transducer and the level of the fluid. For distances involved in ground water wells, which may exceed several hundred meters, ultrasonic energy is not suitable because of the attenuation of the ultrasonic signal over distance. Ultrasonic energy is readily absorbed and reflected by obstructions in a ground water well such as roots, ropes, pipes and wires. Ultrasonic energy has the advantage over short distances of having a faster ramp-up rate resulting in a cleaner pulse of emitted energy. However, over a long distance, an ultrasonic pulse will be reflected by a number of surfaces. The resulting return echo ends up being a jumble of signals which are difficult to segregate between true and false level indications. As a result, ultrasonic energy systems such as that disclosed by the Haynes and Margison system rely upon a sophisticated software program that adds to the expense of the system and may place it out of the reach of individuals reliant upon ground water wells for their drinking water.

What is required is an acoustic measuring system that is simple and inexpensive to acquire and operate and overcomes the problems associated with spurious echoes in an environment where the attenuation characteristics of ultrasonic signals preclude their use.

OBJECTS OF THE INVENTION

It is an object of the present invention to overcome deficiencies noted in the prior art.

It is a further object of the present invention to provide an improved apparatus and method for measuring the level of water in a ground water well.

It is another objective of the present invention to provide an apparatus and method for measuring the level of water in a ground water well that may be obstructed by pipes, electrical wiring and other things preventing the use of line-of-sight measurement.

It is yet another objective of the present invention to overcome deficiencies associated with the use of ultrasonic distance measuring devices in obstructed ground water wells by using sonic frequencies.

It is another objective of the present invention to provide an apparatus and method for measuring the level of water in a ground water well that is inexpensively manufactured and easily operated by individuals who are not skilled in the art of the invention.

SUMMARY OF THE INVENTION

The present invention comprises an apparatus and method for measuring the level of water in ground water wells. The apparatus comprises a sonic pulse emitter adapted to emit a sonic pulse down the ground water well. The apparatus further comprises a sonic pulse receiver adapted to receive the sonic pulse reflected from the surface of water in the ground water well. An excitation circuit is provided and coupled to the sonic emitter so that sonic emissions of a predetermined frequency and amplitude can be emitted. A microprocessor is coupled to the sonic receiver and emitter so that time-of-flight ($t_f$) measurements can be made to determine the distance from the emitter to the surface of water in the well using the relationship $D=S(t_f)/2$ where S is the speed of sound. The apparatus further includes a programmable read only memory for storing an operating program and application program for the microprocessor. The apparatus also includes a comparator circuit connected to the sonic pulse receiver in order to compare the amplitude of the received sonic pulse signal with a threshold amplitude value below which the signal will be rejected. An analogue to digital converter may also be used to convert the signal level to digital format allowing a microprocessor to perform signal analysis and to compare the signal to a variable threshold via software routines.

In the method of the invention, low frequency emissions in the sonic range are chosen because such emissions are not significantly attenuated by air or humidity over long distances and are not susceptible to reflection from obstructions in the well. In one embodiment of the method of the invention, a single low frequency pulse is emitted down the well. To avoid constructive and destructive interference in the well between emitted and reflected signals and to avoid as much spurious echoing as possible, the ideal frequency of the sonic pulse is determined to be in a range between a low value and a high value. The low value of the frequency is calculated using the relationship $f_{LOW}=SW/2D_{MIN}$ where S is the speed of sound (1130 f/s or 344 m/s) and W is the mechanical vibration factor of the sonic emitter, that is, the number of times the emitter vibrates for each emission and $D_{MIN}$ is the minimum value of the distance between the sonic emitter and the surface of the water. The high value is calculated using the relationship $f_{HIGH}=S/3\theta$ where S is the speed of sound and $\theta$ is the diameter of the well in meters or feet. The sonic emission will be reflected up and down the well a plurality of times. These cycles of reflection can be used to calculate an average time-of-flight and thereby enhance the accuracy of the measurement of D.

In the preferred embodiment of the method of the invention, the first low frequency sonic emission is used to calculate the distance D. A second higher frequency emission, still in the sonic range, is then used to increase the accuracy of the first measurement. Although the higher frequency emission will produce a reflected signal that is both noisier and weaker than that produced by the lower frequency emission, the microprocessor can establish temporal windows located where the reflected signals from the higher frequency emission are anticipated based on time-of-flight measurements from the first lower frequency emission. The frequency of the second emission is calculated using the relationship $f=S/2\theta$ where S is the speed of sound and $\theta$ is the diameter of the well in meters or feet.

BRIEF DESCRIPTION OF THE DRAWINGS

The foregoing and other objects, features and advantages of the invention will be apparent from the following more particular description of the preferred embodiments of the invention as illustrated in the accompanying drawings in which like reference characters refer to the same parts throughout the different views. The drawings are not necessarily to scale, emphasis instead being placed upon illustrating the principles of the invention.

DETAILED DESCRIPTION

The Problem

Figure 1:
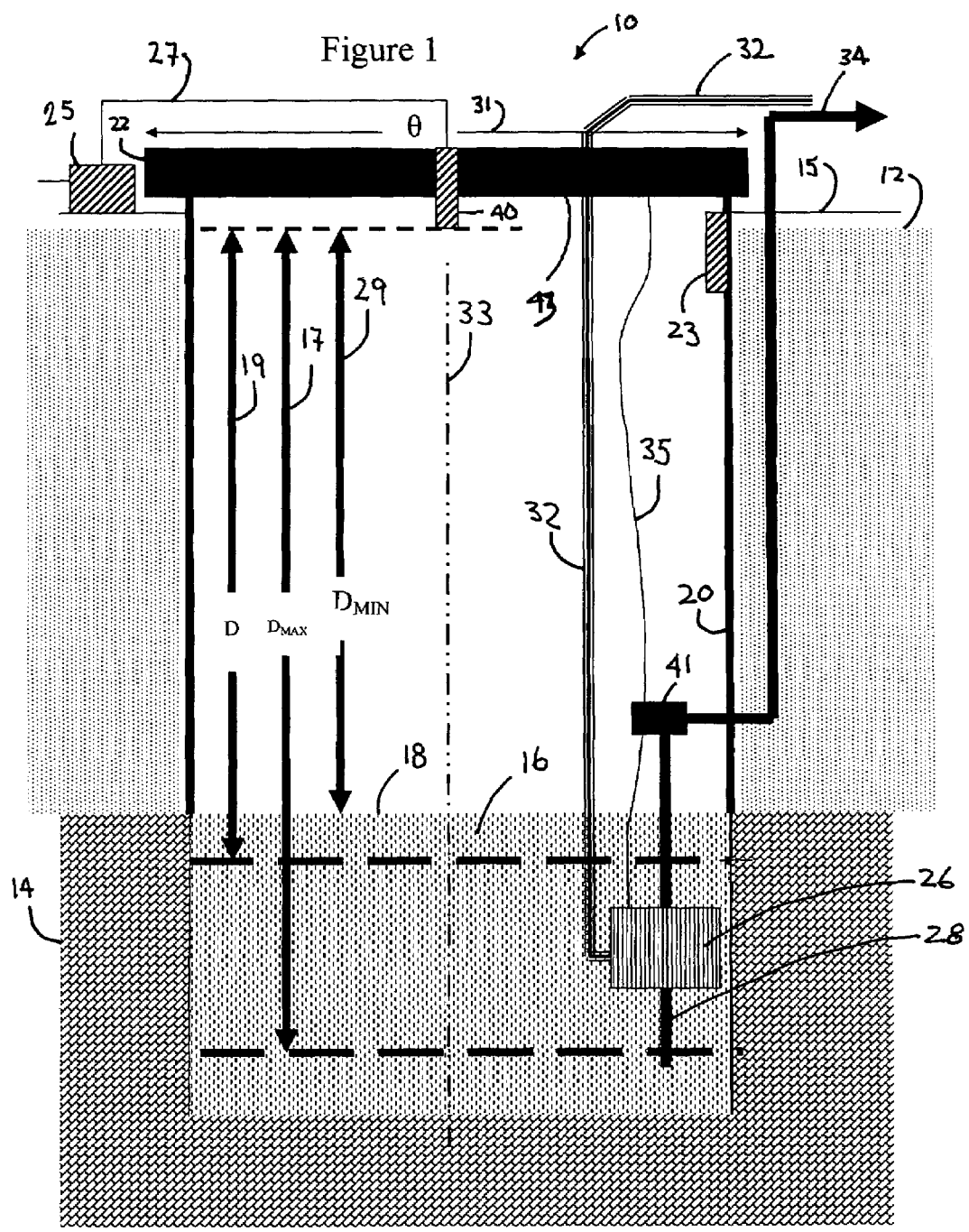
FIG. 1 is a representation of a typical ground water well.

Ground water wells are used for drinking water supplies for millions of people around the world. These wells typically include metallic or concrete casings and are usually capped with a well cap to seal the surface of the well against surface water runoff that may be contaminated with soil bacteria, *e-coli* bacteria, salt, petroleum, chemicals, fecal or other contaminants which are undesirable in ground water. Near the bottom of the well there is usually located a pump for pumping water from the well to the surface for distribution. The pump is usually electrically powered. Therefore, the ground water well will have piping and electrical wiring running into the well. Sometimes a rope will be attached to the pump to secure it to the surface in the event it becomes disconnected from the pipes and wires connecting it to the surface. A typical ground water well (10) is illustrated in FIG. 1. The profile of the well in FIG. 1 is greatly exaggerated in order to show the various components and potential obstructions in the well. Such wells may only be several inches in diameter. The well penetrates soil (12) from the surface (15) into a ground water bearing aquifer (14). Ground water (16) collects at the bottom of the well and rises to a level (18) in the well. Level (18) varies up and down according to the season, the amount of water drawn from the well, and weather so there will be a $D_{MIN}$ (29) representing the high water mark in the well and the shortest distance the sound waves will have to travel to reflect off of the surface of the water (18). There is also a $D_{MAX}$ (17) which represents the lowest acceptable level of the water in the well and is generally close to the level of the pump intake. $D_{MAX}$ may be used to calculate an appropriate strength or amplitude for the emitted sonic pulses. The position of the surface of the water (18) is usually measured as a function of the distance (D) (19) between the sonic emitter/receiver (40) located on the inside surface (43) of the well cap (22) and the surface of the water (18). An alternative position for the sonic emitter/receiver is shown as (23) on the side of the well casing (20). The distance D may be several meters or several hundred meters depending on the location of the well and the depth of the aquifer. The well has an axis (33) and may include a well casing (20) which extends through the soil (12) either to the vicinity of the aquifer or to bedrock, whichever is encountered first. The well casing (20) is comprised of metal, wood, clay, concrete or some other impermeable barrier. The well is also typically sealed with a well cap (22) to prevent surface water from running directly into the well and to prevent animals and trash from entering the well. The well typically further includes an electrical motor and pump (26) having an intake (28) below the surface of the water and pipe (34) which attaches to a pitless adapter elbow (41) which directs the water through the well casing (20) to the distribution system (a pressure tank or other point-of-use, not shown). The electric motor is connected to a power cable (32). Shallow wells may be operated with an external pump such as a convertible jet pump. In this case there may be no wires leading into the well, but there may be additional pipes as a jet pump requires two pipes to enter the well. It is also possible to operate more than one pump in a single well which would result in additional pipes, wires and pumps. In some cases there may be a rope (35) between the pump and the surface to ensure that the pump does not fall to the bottom of the well in the event that it becomes disconnected from the pipe (34) and electrical cable (32).

The well casing in a typical ground water well has an inside diameter ($\theta$) (31) of about 4 to 7 inches. The diameter of the water pipe (34) bringing water to the surface of the well for distribution is typically 1 to 2 inches in diameter. Therefore, such a well will have an obstruction of about 5% just from the pipe alone. Add to this, potential obstructions from pump electrical power supply wires, additional pipes, ropes, connectors and adapters and the amount of obstruction in a ground water well can increase significantly. Bends in the well or discontinuities in the well casing can also serve to obstruct the well.

Clearly, there is a need to continually monitor the position of the water surface (18) of the water in the well. Various visual methods of measurement are available such as steel tape and chalk, mechanical pressure gauges, float and recorder systems and pressure transducer and recorder systems. Each of these methods has inherent shortcomings. For example, steel tape and chalk requires multiple measurements and an average to be taken. Float recorders are affected by friction within the recorder and friction between the float and the sides of the well. These systems can also cause water contamination as they physically contact the water and may be moved from well to well resulting in additional contamination of multiple wells.

Contactless level measurement techniques offer the best solution to problems associated with mechanical and visual systems of ground water well level measurements. Ultrasonic fluid level measurement techniques are well known and are often employed in process systems. Such techniques utilize an apparatus comprising an ultrasonic sound wave emitter and receiver often in the form of a transducer, an excitation circuit and a signal processor. An ultrasonic sensor is capable of measuring distance by sending a pulsed ultrasound wave at the object and then measuring the time for the sound echo to return. Knowing the speed of sound, the sensor can determine the distance of the object. There are a number of advantages associated with ultrasonic distance measurement such as its non-contact nature, the ability to accurately measure distances up to several meters, the fact that ultrasonic waves are unaffected by the transparency or other optical characteristics of the target and the fact that the surface texture of the object is generally not a problem.

Inadequacies of Ultrasonic Measurement

For a deep ground water well, ultrasonic measurement systems are inadequate. The amount that an acoustic waveform is attenuated over a given distance is proportional to frequency. The higher the frequency, the greater is the attenuation. Ultrasonic sound waves are quickly attenuated over distances. For example, a 4 KHZ sound wave attenuates approximately 1 db for every 100 meters traveled. Depending on temperature, pressure and humidity levels, an ultrasonic sound wave of 40 KHZ may attenuate in air almost 100 db for every 100 meters traveled. As a result, for deep well measurements beyond several meters an ultrasonic sound wave will not be able to create a sufficiently strong return echo to be useful in distance measurement applications. Additional problems are created for ultrasonic measurement techniques when the ground water well contains other reflective or absorbing surfaces in the form of obstructions between the source of the ultrasonic pulse and the target, namely, the water level in the well. These obstructions are in the form of pipes, wires, and pumping apparatus as shown in FIG. 1. Ultrasonic energy waves are easily reflected or absorbed by such obstructions. In shallow well applications, obstructions between the ultrasonic source and target water level will create several detectable return echoes which can reduce the validity of distance measurement by confounding the return echo detection system.

Figure 2:
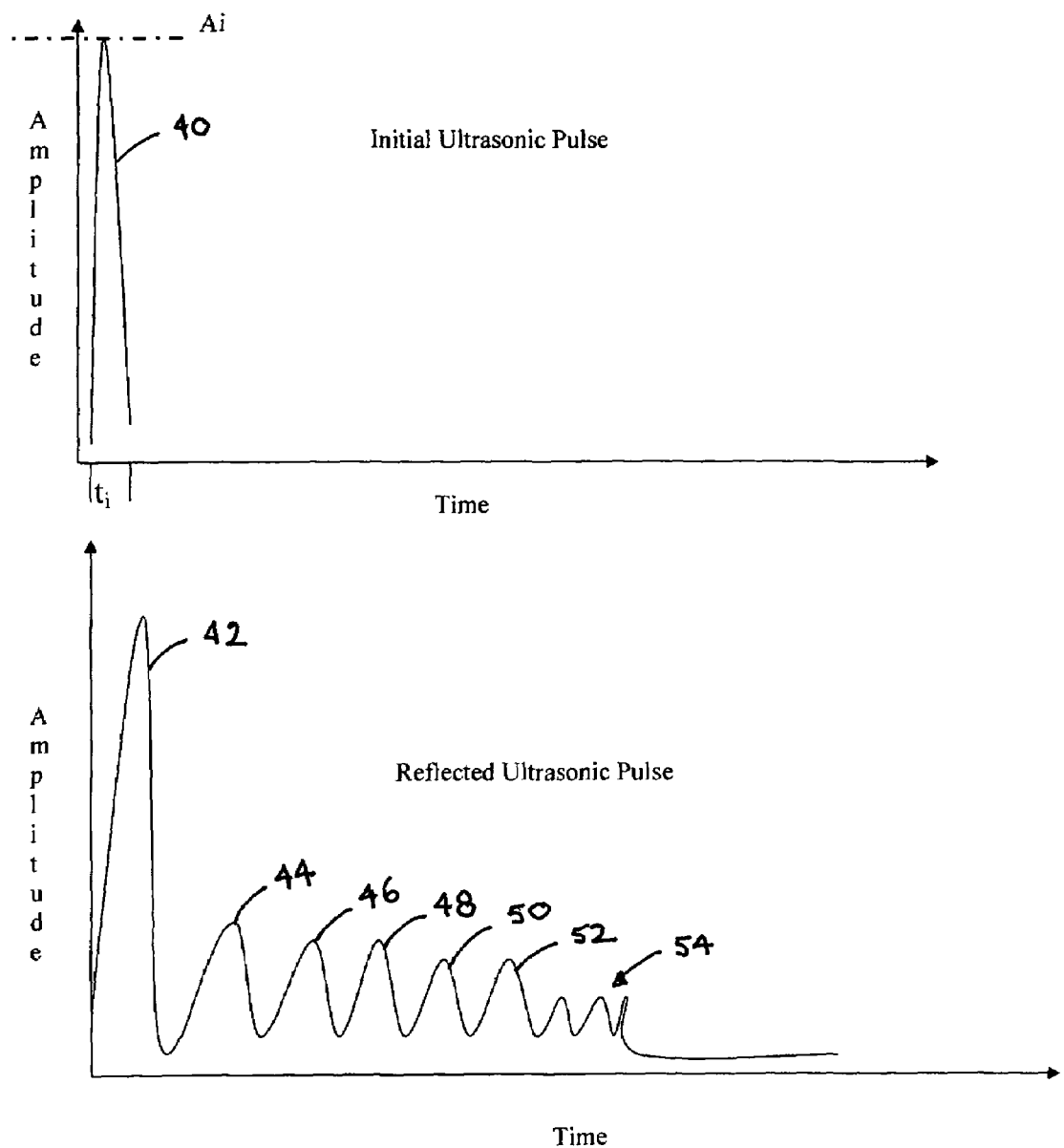
FIG. 2 is a representation of an initial and reflected ultrasonic pulse.

Referring to FIG. 2, there is shown a representation of an initial ultrasonic pulse (40) emitted by an ultrasonic pulse emitter from the top of a shallow ground water well as depicted in FIG. 1 down the axis of the well. The pulse has an initial amplitude $A_i$ and a duration $t_i$. The pulse is shown as a sinusoidal wave in FIG. 2 but a person skilled in the art would understand that the wave could be an arbitrary waveform and could be made up of several cycles of the waveform. The initial pulse (42) received by the ultrasonic pulse receiver is the same pulse emitted by the emitter not having traveled the length of the well and not having reflected from any reflected surface. Since the emitter and receiver are in such close proximity, pulse (42) is not an echo pulse and is received by the receiver almost instantaneously after the emitter emits the pulse (40).

Referring to FIG. 1 and FIG. 2, the next series of pulses shown are echo pulses reflected from various obstructions located within the well. For example, echo pulse (44) could represent a reflection from the pitless adapter (41); echo pulse (46) could represent a reflection from pipe (34); echo pulse (48) could represent a reflection from a discontinuity in the well casing (20); echo pulse (50) could represent a reflection from the casing of the electric motor (26); and, echo pulse (52) could represent a reflection from the target water level (18). Other pulses (54) could represent reflections caused by the signal reflecting off or between the obstructions listed above while returning to the surface from the water level (18). Since the ultrasonic pulse emitted by the emitter would be significantly attenuated in the air in the well, echo pulse (52), the furthest distant from the emitter, might appear to have a magnitude equal to or less than previous echo pulses. This would create a lot of confusion as to which signal was the desired reflection from the surface of the water. Therefore, there are disadvantages and shortcomings associated with the use of an ultrasonic distance measuring device in a ground water well as depicted in FIG. 1.

The Apparatus of the Invention

My invention is an acoustic distance measuring device adapted to measure the level of water in a ground water well using sonic frequency emissions well below the ultrasonic range in order to overcome the problems associated with ultrasonic emissions in deep and potentially obstructed wells previously mentioned. As shown in FIG. 1, the ground water well has an axis (33) and a well cap (22) with an underside surface (43). The sonic emitter/receiver (40) is installed on the underside surface. The position of the surface of the water in the well (18) is measured as a function of the distance (D) from the tip of the sonic emitter/receiver to the surface of the water level (18).

Figure 3:
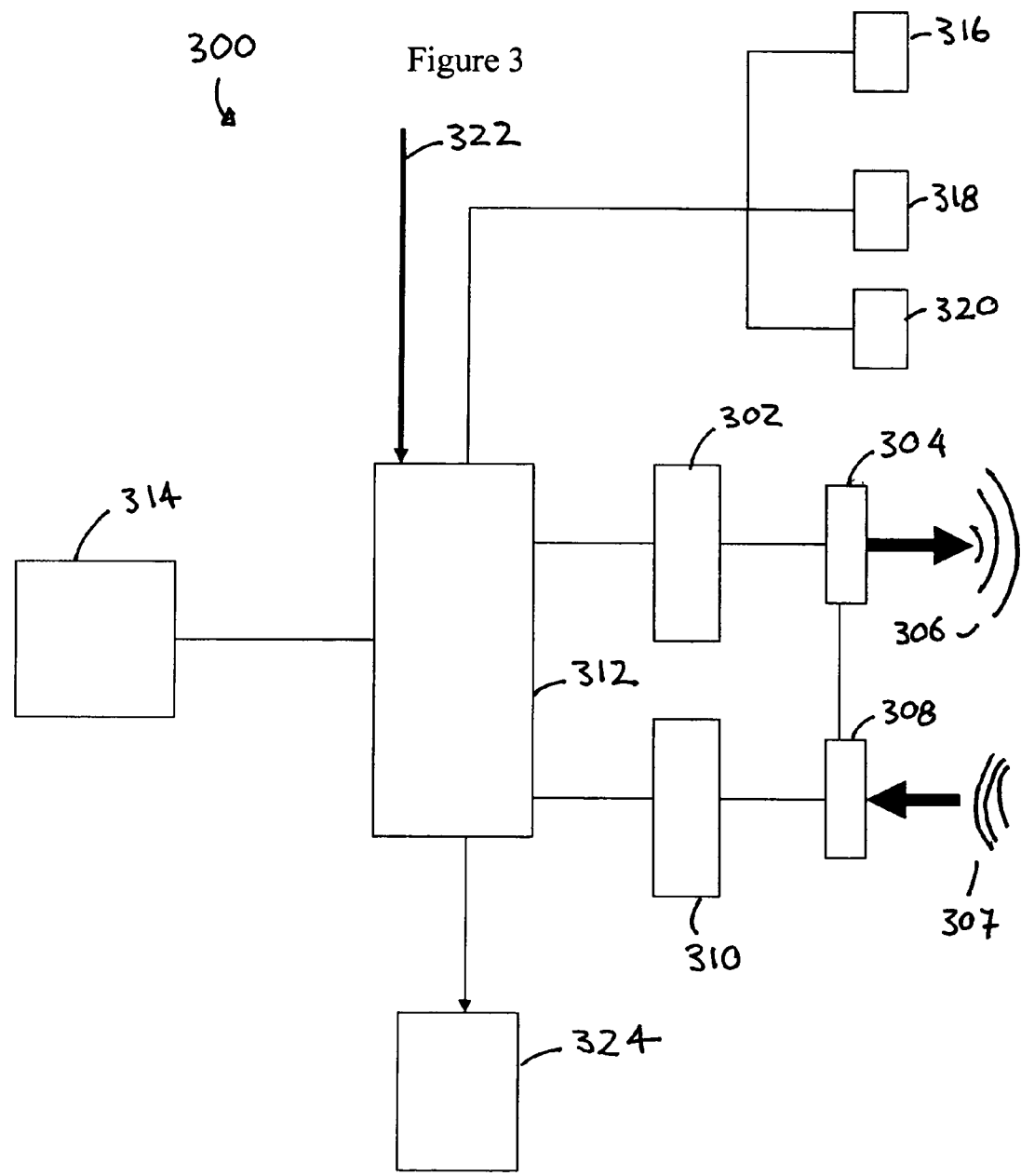
FIG. 3 is a block diagram representing the apparatus of the present invention.

Referring to FIG. 3, the apparatus (300) of my invention comprises an electrical signal generator (302) adapted to generate an electrical signal of having an initial amplitude $(A_i)$, a frequency (f) and a period (P). Coupled to the electrical circuit is a sonic pulse emitter (304) adapted to convert the electric signal into a sonic pulse (306). The sonic pulse emitter (304) is adapted and oriented to emit a sonic pulse (306) down the axis (33) of the ground water well. The emitted the sonic pulse (306) is reflected back (307) to the sonic pulse receiver (308) from the surface of the water (18). The sonic pulse receiver (308) is installed proximate to the sonic pulse emitter. The sonic pulse receiver (308) is adapted and oriented to receive the reflected sonic pulse (307) having an amplitude $A_R$ from the surface of the water. The sonic pulse receiver generates an electrical signal characteristic of the reflected sonic pulse. The amplitude of the signal generated by the sonic pulse receiver is converted to a digital signal by an analog to digital converter circuit (310) and then received by a microprocessor (312) connected between the sonic pulse emitter and the sonic pulse receiver. The analog to digital converter (310) may be a signal comparator which compares the amplitude of the received signal $A_R$ to a threshold $A_{LIM}$ resulting in a one-bit representation of the analog signal. The threshold value may be variable or fixed. Additional signal processing functions as are well known in the art such as filtering, phase shifting and automatic gain control can all be applied to the analog or digital representations of the received signal. A memory device (314) is connected to the microprocessor and contains both operating programs and application programs for the microprocessor in order to measure the time-of-flight $(t_f)$ of the emitted sonic pulse from the sonic pulse emitter to the surface of the water in the ground water well and back to the sonic pulse receiver. Once the time-of-flight measurements are made, the microprocessor calculates distance (D) according to the relationship $D=S(t_f)/2$ where S is the speed of sound. There may also be a plurality of sensors connected to the microprocessor and located both in the well and outside of the well to detect temperature (316) and humidity (318) or precipitation (320). The invention may take measurements at regular intervals based on time, at intervals based on well activity such as pump operation, or based on input directly from the operator of the invention by a manual trigger using a remote command connection (322). The level of the water in the well is annunciated by the communication module (324). The communication module may be a screen, a wireless link, a network connection, an alarm, or a data output to another electronic device which requires information about the level of water in the well.

The integration level of microprocessor and microcontroller based systems is generally increasing. The elements shown in FIG. 3 may not be physically implemented as discrete components, but may instead be entirely or partially integrated together in a single mixed signal component.

Overcoming the Problem by Using Sonic Pulses

It is well known that low frequency pulses in the sonic range are much less susceptible to attenuation over distance, absorption and reflection by obstructions in their path. Therefore, there is less likelihood of false return signals and the initial wave front of the emitted sonic pulse is more likely to reach the target water level and reflect back to the sonic pulse receiver as a high amplitude signal easily distinguished from background noise and spurious echoes. This is illustrated with reference to FIG. 4 which shows the initiation and reflection of a 300 HZ pulse within a seven inch diameter well. The initial sonic pulse at 300 HZ is illustrated at (60). The initial pulse is preferably a single sine wave. However, the pulse can also be of any useful wave shape for distance measurement. In this example, a single 300 HZ sonic pulse is sent down a seven inch diameter well. The pulse (62) is not a reflected pulse but is the emitted pulse received by the sonic pulse receiver almost immediately after emission. Additional cycles of energy may be detected at the sonic receiver due to mechanical vibrations of the sonic emitter and possible ringing of input filters. Small reflections at (64) and (66) may be detected due to reflections off of smaller reflecting surfaces in the well such as the pitless adapter. However, because sonic energy is not readily reflected off of these small surfaces, the reflected echo will appear to be very small. The sonic wave will proceed past these obstructions generally intact and without any significant attenuation (less than 1 dB of signal loss per 100 m of travel) or reflection until it contacts the water surface in the well. The water surface, because it is incompressible and because it completely blocks the entire cross-section of the well, will reflect most of the incident sonic energy back up the well to the sonic receiver. The reflected energy signal will appear as wave form (68) and is easily distinguishable from the smaller wave forms representing spurious echoes and noise (70). Since the amplitude of the reflected wave is large and energetic, it will reflect off of the inside surface (43) of the well cap and back down the well to the surface of the water (18). The wave will then reflect off of the surface of the water and back to the inside surface of the well cap where it is detected as wave form (72). Subsequent reflective cycles will occur as indicated by wave forms (74) and (76) until the reflected wave no longer has an amplitude AR greater than the threshold amplitude $A_{LIM}$ of the sonic receiver. The microprocessor will measure the time-of-flight $t_{f1}$ to $t_{f4}$ for each (successive) reflective cycle from the sonic emitter to the reflecting surface of the water in the well and back to the sonic receiver. The microprocessor can apply standard signal processing techniques such as averaging, deviation measurement and phase detection to increase the accuracy of the measurement using these multiple reflections. In general, accuracy may be increased by as much as the root of the number of samples in situations like this one. Therefore if 4 echoes are detected, accuracy may be doubled when compared to a single reflection. For 9 echoes, accuracy of the time of flight $t_f$ measurements may be tripled. For the calculation of the initial time-of flight $t_{f1}$ the time at which the sonic pulse is emitted is deemed to be the time at which the emitted pulse is received directly by the sonic receiver, that is, without any reflection ($t_0$). Since the sonic emitter and sonic receiver are co-located, the time interval between the sonic emission and the reception by the receiver is almost negligible compared to the time-of-flight. The time at which the time-of-flight ends is taken to be the time at which the reflected signal is received by the sonic receiver, $t_1$. Therefore, the initial time-of-flight is measured by the microprocessor using the relationship $t_{f1}=t_1-t_0$. The subsequent time-of-flight measurements for each successive cycle are calculated in a similar fashion.

Figure 4:
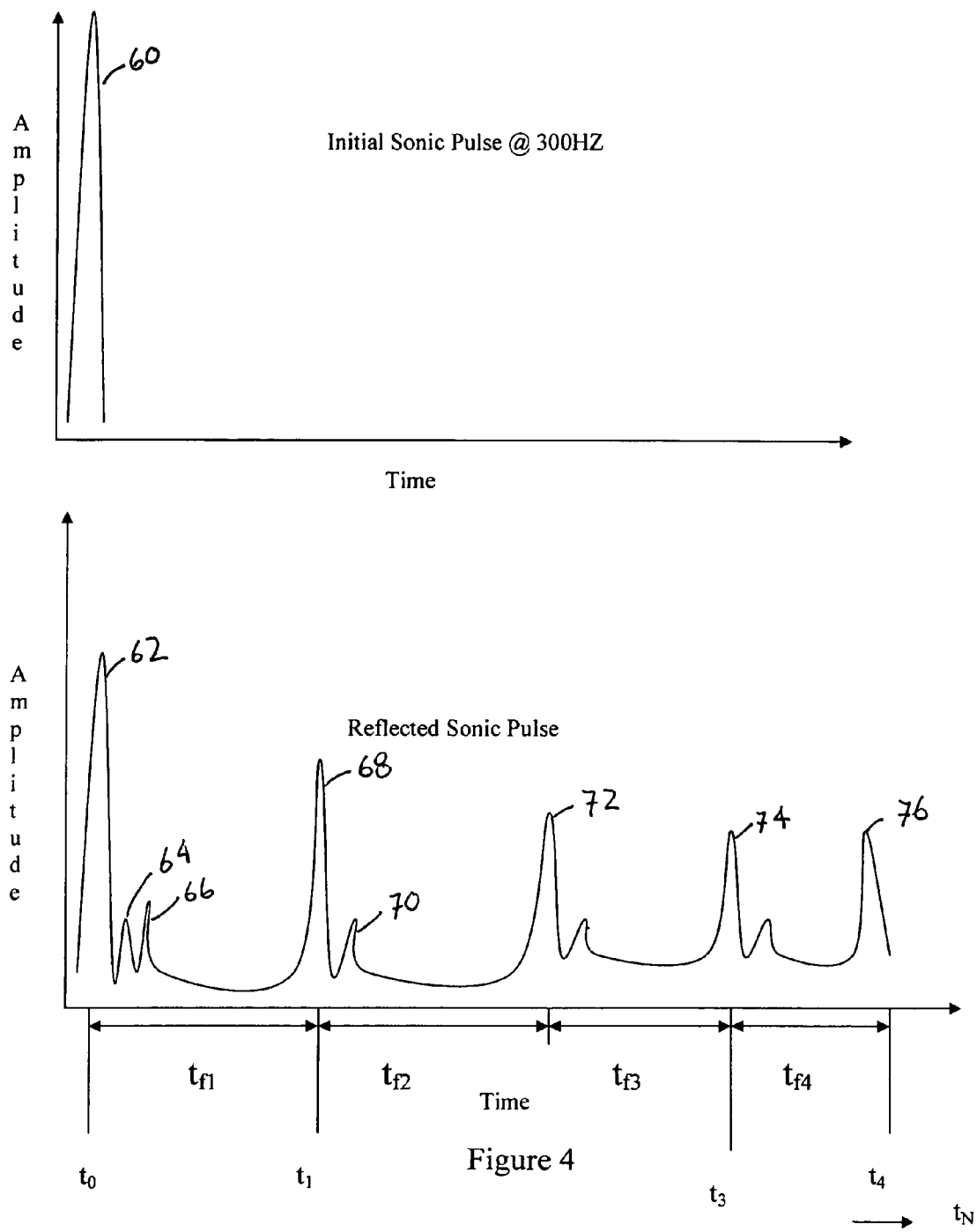
FIG. 4 is a representation of an initial and reflected sonic pulse of 300 HZ.

Using a First Lower Frequency Pulse and a Subsequent Second Higher Frequency Sonic Pulse In one embodiment of the invention, an initial sonic frequency is emitted as shown in FIG. 4 and then the time-of-flights are measured and distance D is calculated based on the reflective cycles. Distance measurement accuracy can be further enhanced by emitting a higher frequency signal after the lower frequency signal is sufficiently attenuated so as not to interfere with the subsequent higher frequency emission. Therefore, the sonic pulse emitter and the sonic pulse receiver are both adapted to emit and receive pulses at different frequencies. However, the higher frequency emission will be more susceptible to unwanted echoes and attenuation over distances. To overcome this problem, the first lower frequency emission as shown in FIG. 4, is used to calculate reception windows representing the temporal location of the anticipated reflected wave, for example, $t_1$. When the higher frequency emission of 1000 HZ is emitted, its reflections will fall within the range of the reception windows calculated by the microprocessor.

Figure 5:
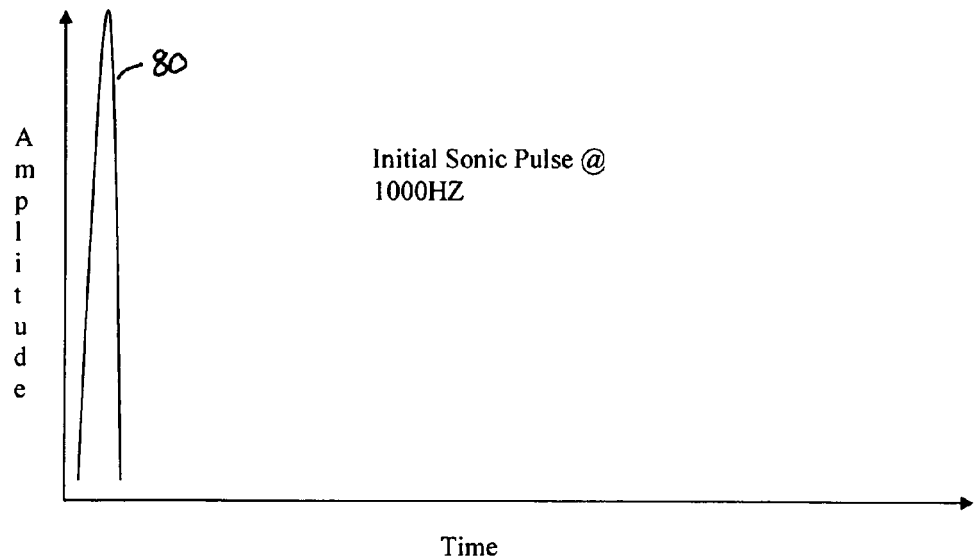
FIG. 5 is a representation of an initial and reflected sonic pulse of 1000 HZ.
Figure 5:
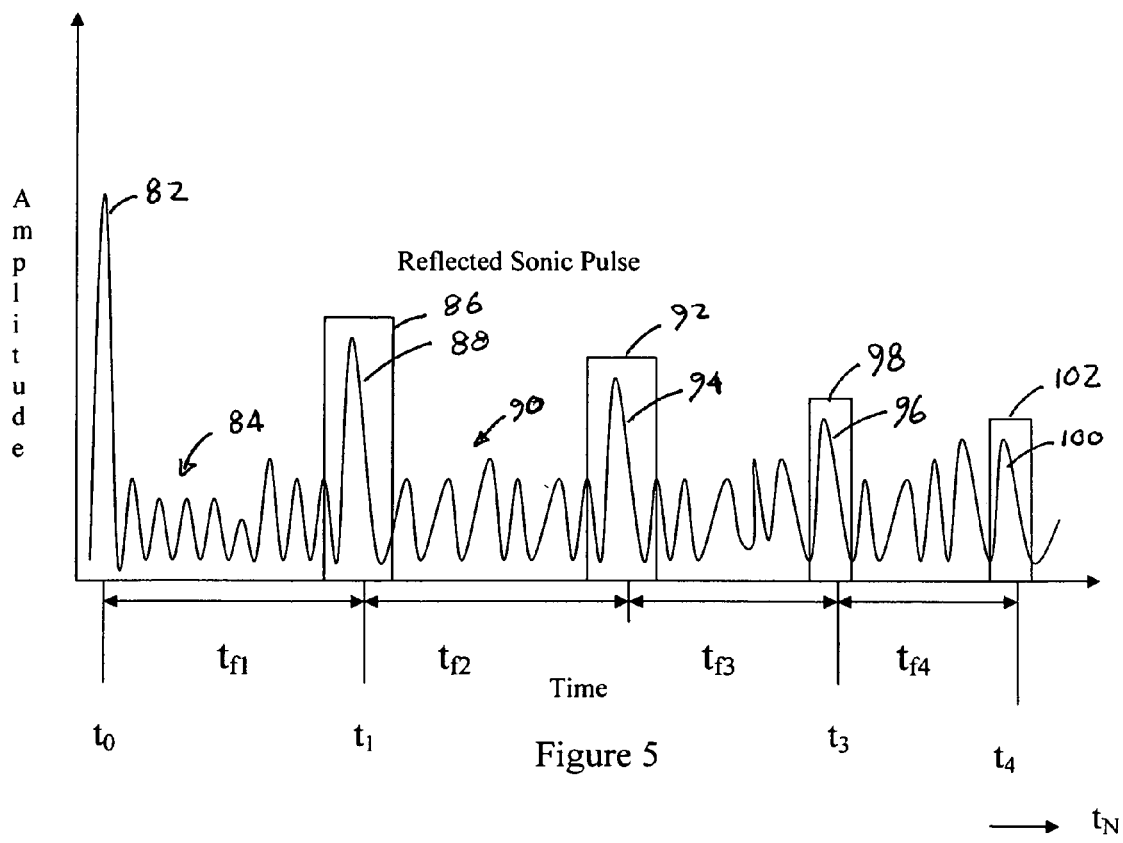
Figure 6:
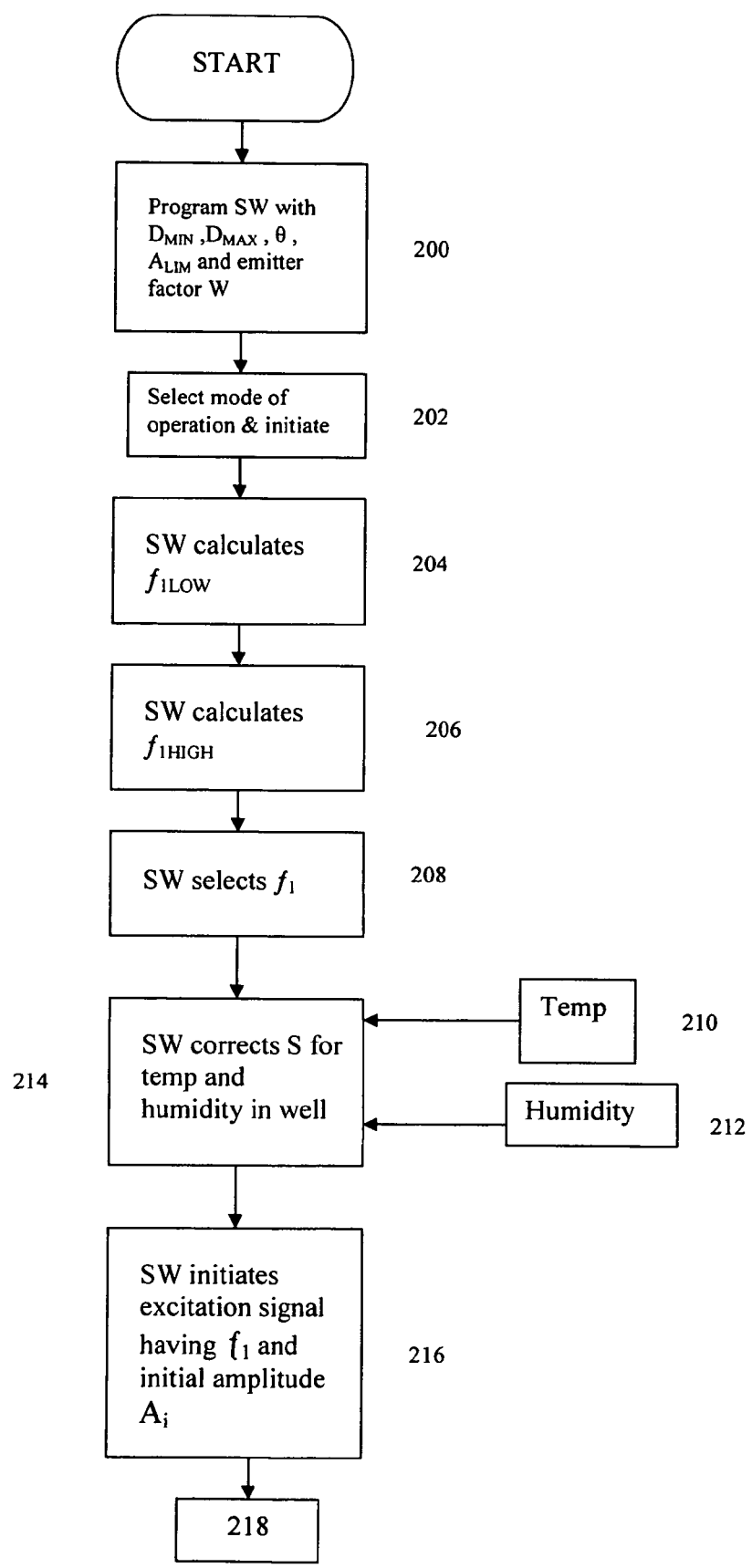
FIG. 6 is a block diagram of the operation of the invention.
Figure 7:
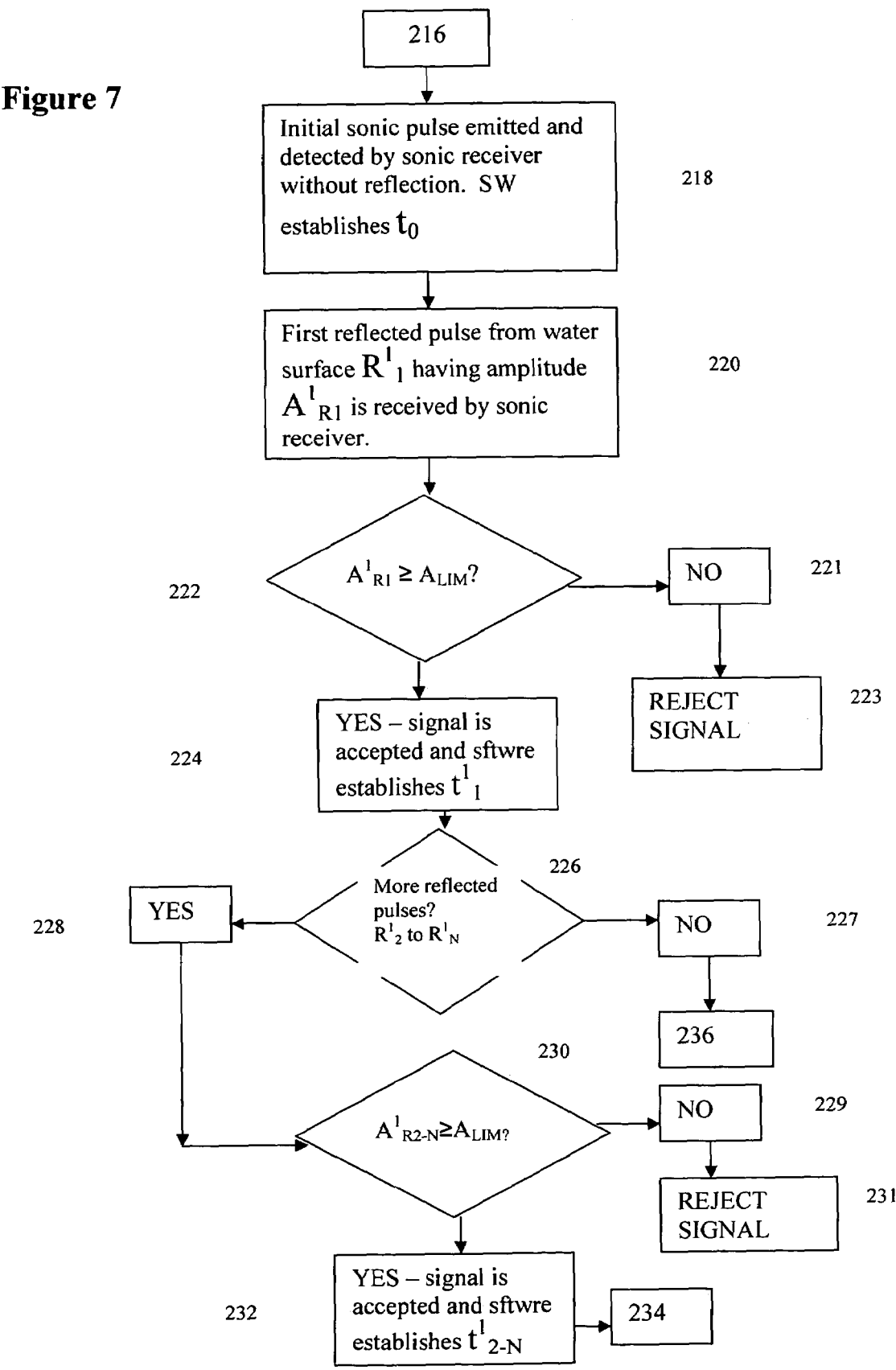
FIG. 7 is a continuation of FIG. 6.
Figure 8:
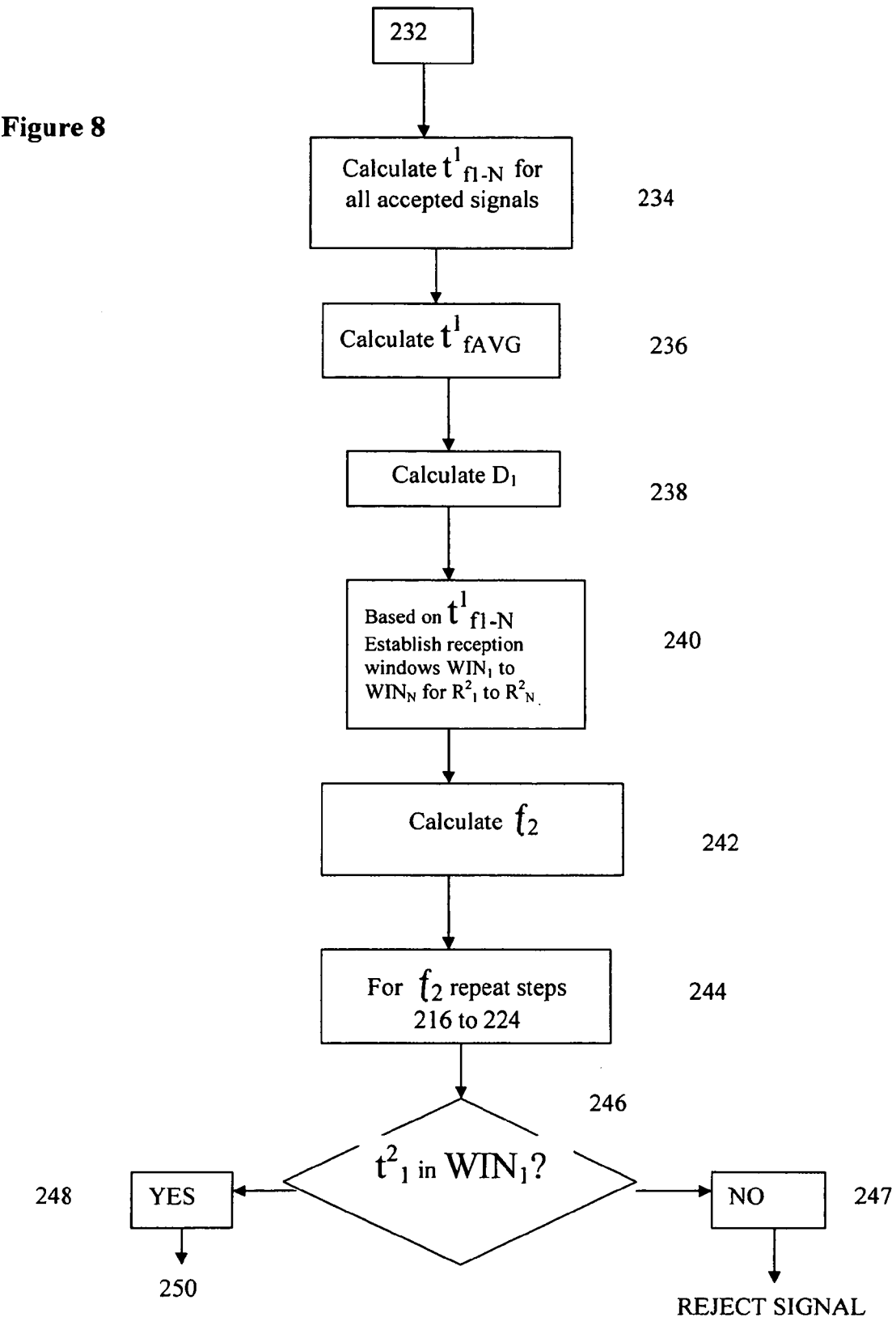
FIG. 8 is a continuation of FIG. 7.
Figure 9:
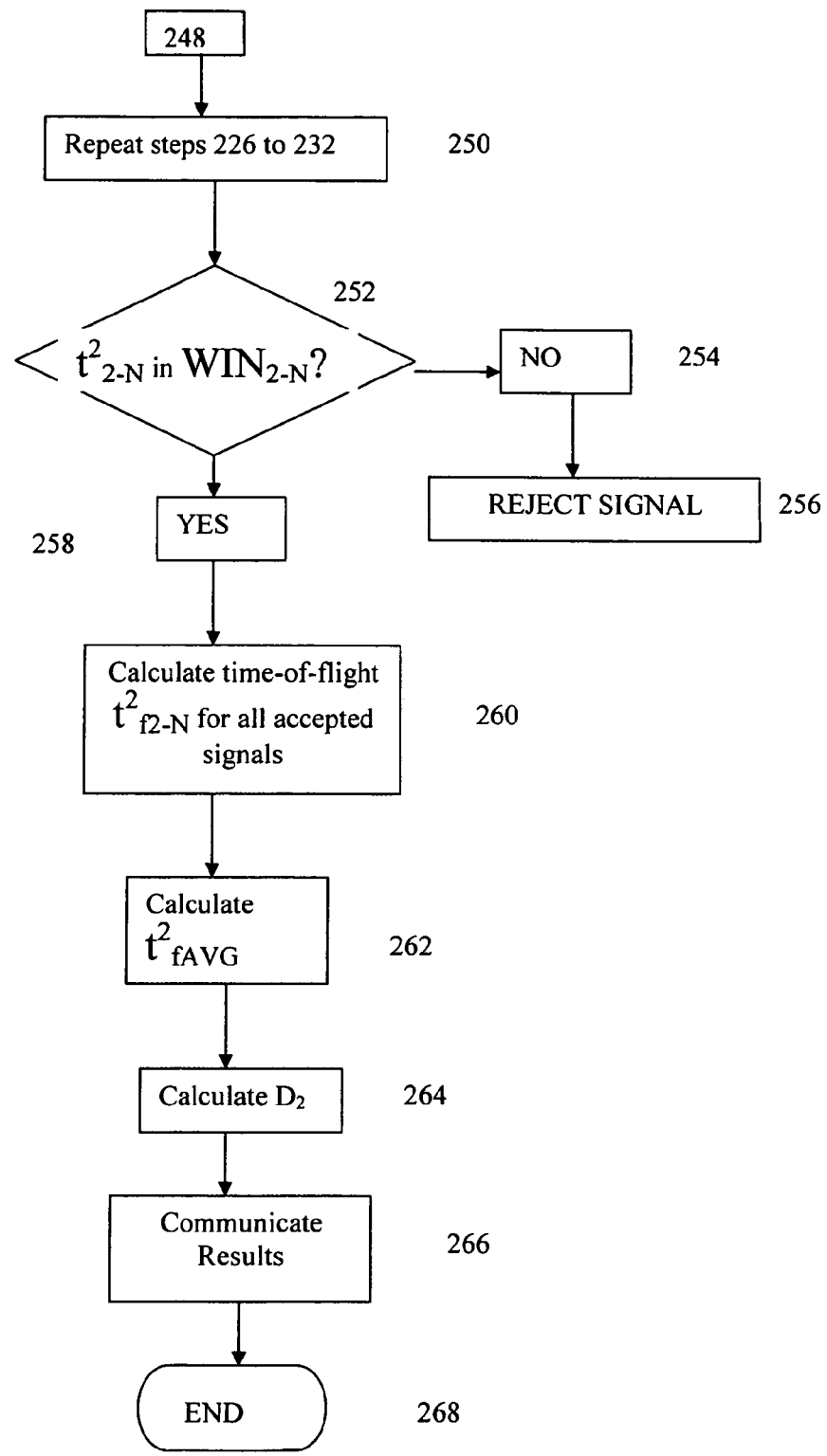
FIG. 9 is a continuation of FIG. 8.

Referring to FIG. 5, the initial sonic pulse (80) is emitted at 1000 HZ. The first received sonic pulse (82) is received by the sonic receiver directly from the emitter without reflection. The higher frequency emission is more susceptible to being reflected from obstructions in the well such as pipes and wires as shown in FIG. 1 as well as from the walls of the well and the pitless adapter. Therefore, FIG. 5 shows a plurality of echo signals and noise (84). The microprocessor has calculated the location of the first reception window (86) in the region of $t_1$ based on the previous low frequency emission. The echo signal (88) falling within that window is represents the reflection from the water surface. Echo signal (88) is reflected from the inside surface of the well cap to the surface of the water. Again, multiple echoes (90) will be received by the sonic receiver representing reflections from obstructions within the well. Second reception window (92) is located where the second reflected echo signal (94) from the surface of the water is expected to be according to the first low frequency emission. Second echo signal (94) is reflected from the inside surface of the well cap to the water level and back to the sonic receiver. The third echo signal (96) is expected to fall within window (98) and the fourth echo signal (100) is expected to fall within window (102). Note that the higher frequency echo signals are significantly attenuated and begin to merge with the noise signals as the number of reflections increase. Therefore, although the higher frequency signal affords greater accuracy in distance measurement, it is necessary to establish reception windows in order to segregate the true signal reflected from the water surface in the well from noise. Once the amplitude of the reflected signal falls below the predetermined amplitude threshold of the sonic receiver no further echoes are recorded. The calculation of time-of-flight for each reflected echo and the calculation of D follows the same process as described for the low frequency signal. The microprocessor can also narrow the windows and emit a second higher frequency pulse in order to further increase the accuracy of the time-of-flight calculations and distance D measurements.

Calculating Frequencies

For the purposes of illustration of the principles of my invention, the foregoing examples used a low frequency sonic wave of 300 HZ and a higher sonic wave of 1000 HZ. However, frequency selection is important and is dependent upon the diameter of the well. Generally, if the wavelength of the sonic emission is less than the diameter of the well the sonic wave front will reflect off of the walls of the well and cause a significant amount of noise received by the sonic receiver. Short wavelengths are also prone to constructive and destructive interference as they travel transversely across the well and longitudinally down the well. If the wavelength of the sonic emission is too long the wave front will reflect back to the sonic receiver before the actual sonic emission is complete.

To overcome these problems, it has been determined that a the highest first sonic emission $f_{1HIGH}$ should have a wavelength ($\lambda$) that is at least three times the diameter $\theta$ of the ground water well or $\lambda \geq 3\theta$. Therefore, $f_{1HIGH}$ can be calculated using the relationship $f_{1HIGH}=S/3\theta$ where S is the expected speed of sound and $\theta$ is the diameter of the well in meters or feet. For a seven inch diameter well (0.58 feet) the highest sonic frequency used for distance measurement should not be over about 650 HZ. Similarly, the lowest frequency for distance measurements in a seven inch diameter well $f_{1LOW}$ can be calculated as a function of the minimum distance or depth $D_{MIN}$ (FIG. 1 Item 29) to be measured in the well $f_{1LOW}=SW/2D_{MIN}$ where S is the speed of sound (1130 f/s or 344 m/s) and W is the mechanical vibration factor of the sonic emitter, that is, the number of times the emitter vibrates for each emission. For example, the sonic emitter may oscillate 5 times for a given emission in which case W=5. If, in a seven inch diameter well, $D_{MIN}$ is 10 feet and W=5, then $f_{1LOW}$=280 HZ to avoid the emitted signal from interfering with the reflected signal. Hence, a suitable low frequency emission for a seven inch ground water well would be about 300 HZ as per the example shown in FIG. 4. These formulae can be applied for very small diameter wells or bores down to 1 inch in diameter as might be found in test bores. In such a case the maximum low frequency pulse would have a frequency of 4.5 kHz which is well within the sonic range and would provide accurate measurements with low attenuation and noise.

A second higher sonic frequency emission is used to further refine the accuracy of the measurement D, as illustrated in FIG. 5. The second frequency $f_2$ can be calculated based on the relationship $f_2=S/2\theta$. Therefore, for a seven inch well, the higher frequency $f_2$ would be about 975 HZ or rounded up to 1000 HZ as illustrated in FIG. 5.

Using Multiple Pulses

Ideally, a single pulse of sonic energy having a predetermined frequency and amplitude is required to calculate the distance D. However, in an environment where D is very long or there is much extraneous noise, it is desirable to emit a series of pulses [$P_1$ to $P_N$] in the form of a short burst of sonic energy. The short emitted burst of sonic energy must be short enough so that it is terminated before the first reflected signal is received at the sonic receiver otherwise constructive [$P_1$ to $P_N$] or destructive interference may occur. Such a sonic burst comprising a series of sonic pulses [$P_1$ to $P_N$] may be useful where filters are employed in the circuitry and require several received cycles of audio energy to properly resonate. Furthermore, a plurality of sonic pulses is useful when the distance D to be measured is long and the reflected signal needs to be strong enough to be detected as multiple pulses will contain more energy than a single pulse and will therefore be more easily detected. The number of transmitted pulses can also be dynamically varied by the microprocessor.

Operation of the Invention

In a first mode of operation a pulse of sonic acoustic energy is transmitted down the axis of the well creating a plurality of reflected pulses $R_1$ to $R_N$ having respective amplitudes $A_{R1}$ to $A_{RN}$. A first reflected pulse $R_1$ is received by the sonic pulse receiver. The microprocessor will measure the time-of-flight ($t_f$) of said first reflected pulse $R_1$. Then all subsequent reflected pulses $R_2$ to $R_N$ will be received and their respective time-of-flights will be measured. Each of the individual time-of-flight measurements will be averaged for all of the plurality of reflected pulses $R_1$ to $R_N$. Finally, the microprocessor will calculate D using the relationship $D=S(t_{favg})/2$ where S is the speed of sound.

It is to be understood that the comparator of the invention will compare each of the amplitudes $A_{R1}$ to $A_{RN}$ of each of the plurality of reflected pulses $R_1$ to $R_N$ to the preset threshold amplitude $A_{LIM}$. Values falling outside the threshold value will be ignored. Furthermore, the the highest allowable frequency $f_{HIGH}$ of the pulse of sonic acoustic energy is determined by the relationship $f_{HIGH}=S/3\theta$ where S is the speed of sound and $\theta$ is the inside diameter of the well and the lowest allowable frequency $f_{LOW}$ of the pulse of sonic acoustic energy is determined by the relationship $f_{LOW}=SW/2D_{MIN}$ wherein S is the speed of and W is the vibration factor of the sonic pulse emitter. The frequency of the emitted sonic pulse will fall somewhere between $f_{LOW}$ and $F_{HIGH}$.

Referring now to FIGS. 6, 7, 8 and 9 the steps of the method of using the preferred embodiment of the invention to measure the depth of a ground water well using sonic pulses will be explained. At step 200 the software contained in the memory device is programmed with the inside diameter ($\theta$) of the well and the maximum distance $D_{MAX}$. Other parameters such as the minimum distance $D_{MIN}$ to be measured, the threshold amplitude ($A_{LIM}$) and the emitter factor "W" representing the number of vibrations of the emitter per emission may be determined on a product by product basis or dynamically varied by the software program. At step 202 the mode of operation of the invention is selected, that is, the apparatus will provide periodic measurements of D at a given time interval measured in seconds to minutes to hours. Demand measurements of D can be taken at any time by a remote command link (item 322 in FIG. 3) to the microprocessor. At step 202 the apparatus operation is initiated when the mode of operation is determined. At step 204 the low range of the emitted frequency ($f_{1LOW}$) is calculated according to the relationship $f_{1LOW}=SW/2D_{MIN}$ based upon the factors entered in step 200. At step 206 the high range of the emitted frequency is calculated based upon the factors entered in step 200 and using the relationship $f_{1HIGH}=S/3\theta$. At step 208, once the frequency range has been established, a suitable value for the frequency $f_1$ between $f_{1LOW}$ and $f_{1HIGH}$ is selected. At step 214 corrections are made to the speed of sound S for temperature 210 and humidity 212 inputs from sensors located in the well. At 216 the initial amplitude $A^1_i$ of the first emitted sonic pulse is automatically selected by the apparatus based on an inputted value of $D_{MAX}$ so that the first emitted pulse will have sufficient strength to reach the bottom of the well and reflect upwards to the sonic pulse receiver. The software may also use a look-up table to select from a series of pre-calculated setup values. At step 216 the electrical signal generator generates an electrical signal having the predetermined frequency $f_1$ and amplitude $A^1_i$. The electrical signal is received by the sonic pulse emitter which then emits a first sonic pulse having the predetermined frequency $f_1$ and amplitude $A^1_i$. At step 218 the sonic receiver will receive the emitted pulse without any reflections and time $t_0$ is established. The first sonic pulse will create a plurality of first reflected pulses $R^1_1$ to $R^1_N$ having amplitudes $A^1_{R1-RN}$. At steps 220 to 231 a combination of hardware and software will continuously monitor the received signals from the sonic receiver. If the amplitude $A^1_{R1-N}$ is greater than a certain threshold $A_{LIM}$ then steps 226 to 231 are repeated until no more sonic pulse reflections are detected, that is, until $A^1_N$ is less than $A_{LIM}$. For each acceptable reflected pulse the time $t^1_{1-N}$ is recorded at step 232. Once all accepted reflected pulses have been received, time-of-flight measurements for each pulse is calculated at 234. At step 236 the microprocessor will calculate the most accurate time-of-flight based on all accepted signals. This may be a simple average of the various time-of-flight measurements, or it may include more complex algorithms. At step 238 the microprocessor will calculate a value for $D_1$ based on the most accurate or average time-of-flight value.

In the preferred embodiment of the invention, a second higher frequency sonic pulse is emitted to improve the accuracy of the measurement of D. Based on the time-of-flight measurements previously obtained from the plurality of first reflected pulses $R^1_1$ to $R^1_N$ created by the first sonic low frequency emission a series of reception windows $WIN_1$ to $WIN_N$ is established for the anticipated plurality of second reflected pulses $R^2_1$ to $R^2_N$ at step 240. Then the acceptable frequency of the second pulse $f_2$ is calculated at step 242. The second higher frequency pulse is emitted and steps 216 to 224 are repeated for the second pulse. However, to be an accepted reflected signal the reception time of the signal must fall within the established window or be rejected at steps 246 and 247. If the reception time for each subsequent reflection falls within the window (steps 250 to 258) then the reception time for each signal $t^2_{f1-N}$ is recorded. Based on these times the most accurate or average time-$t^2_{favg}$ of-flight calculations are rendered at 260. At step 262 the time-of-flight measurements are calculated. The various time-of-flight measurements may be averaged or a more accurate time-of-flight may be calculated using include more complex algorithms. At 264 the microprocessor will calculate a value for D based on the most accurate time-of-flight value from frequency $f_2$. At step 266 the results of the calculation are sent to the communication module. The communication module may be a screen, a wireless link, a network connection, an alarm, or a data output to another electronic device which requires information about the level of water in the well.

A third or more higher frequency sonic pulses may be emitted down the axis of the well to further refine the measurement of D using the method described above.

In another embodiment of the invention, a plurality of pulses having a frequency $f_1$ and $f_2$ can be emitted down the axis of the well instead of a single pulse. This would be useful in the case of deep well measurements of D. The duration of an acoustic emission comprising a plurality of pulses would have to be of such duration so that the emission was terminated before the first reflected pulse is returned to the sonic receiver to avoid interference. The number of transmitted pulses could also be varied by the microprocessor.

Although this description contains much specificity, these should not be construed as limiting the scope of the invention by merely providing illustrations of some of the embodiment of the invention. Thus the scope of the invention should be determined by the appended claims and their legal equivalents rather than by the examples given.

What is claimed is:

1. An acoustic distance measuring device adapted to measure the level of water in a ground water well having obstructions, said ground water well having an axis, wherein said level of water is measured as a function of the distance (D) from said device to the surface of the water level, the device comprising:

a. an electrical circuit adapted to generate an electrical signal having a frequency (f);
   b. a sonic pulse emitter coupled to said electric circuit and adapted to convert said electric signal into a single emitted sonic pulse having a frequency (f) and an initial amplitude $A_i$, said sonic pulse emitter co-axial with the ground water well, the sonic pulse emitter adapted and oriented to emit said single emitted sonic pulse down said axis of the ground water well so that the single emitted sonic pulse is reflected up and down the groundwater well to form a series of successive reflected cycles comprising a series of reflected sonic pulses $R_1$ to $R_N$ having amplitudes $A_{R1}$ to $A_{RN}$ to be received by;
   c. a sonic pulse receiver installed proximate to the sonic pulse emitter and internal to the ground water well, said sonic pulse receiver adapted and oriented to receive said series of reflected sonic pulses $R_1$ to $R_N$ from the surface of the water, the sonic pulse receiver further adapted to generate electrical signals having strengths relative to said amplitude $A_{R1}$ to $A_{RN}$;
   d. a comparator connected to the sonic pulse receiver for comparing amplitudes $A_{R1}$ to $A_{RN}$ with a predetermined and variable threshold value $A_{LIM}$, said comparator adapted to reject any reflected pulse having any of $A_{R1}$ to $A_{RN}$ below $A_{LIM}$; said comparator adapted to send accepted signals to;
   e. a microprocessor connected to said comparator and connected between the comparator and the electrical circuit, said microprocessor programmed to calculate the average time-of-flight ($t_{fAVG}$) of said series of successive reflected cycles having $A_{R1}$ to $A_{RN}$ greater than $A_{LIM}$ and times-of-flight $t_1$ to $t_N$ from the sonic pulse emitter to the surface of the water in the ground water well and back to the sonic pulse receiver, the microprocessor further adapted to calculate said distance (D) according to the relationship $D=S(t_{fAVG})/2$ where S is the speed of sound and wherein $t_{fAVG}=(\Sigma^{t1}{}_{tN}/N)$;

f. a programmable memory device connected to the microprocessor for storing microprocessor operating and application software;

g. means for remotely triggering the device from a remote location; and, h. a display for displaying the level of water in a ground water well remotely.

2. A method of measuring the level of the surface of water in a ground water well having obstructions using a sonic acoustic pulse emitter having a vibration factor (W) and a sonic pulse receiver, said well having an axis, and an inside diameter θ, wherein said level is measured as a function of the distance D between said emitter and said surface, and further wherein the surface has a minimum distance from the emitter of $D_{MIN}$, said method comprising the steps of:

a. transmitting a plurality of pulses $[P_1$ to $P_N]$ of identical frequency of sonic acoustic energy down said axis of said well wherein said plurality of pulses $[P_1$ to $P_N]$ of identical frequency of sonic energy each have duration that is sufficiently short to avoid interference with reflected pulses;

b. for each of the plurality of pulses $[P_1$ to $P_N]$ creating a plurality of reflected pulses $R_1$ to $R_N$ having respective amplitudes $A_{R1}$ to $A_{RN}$;

c. receiving a first reflected pulse $R_t$;

d. comparing the amplitude $A_{R1}$ to $A_{RN}$ of each of the plurality of reflected pulses $R_1$ to $R_N$ to threshold amplitude $A_{LIM}$;

e. ignoring pulses having an amplitude that is less than $A_{LIM}$;

f. measuring the time of flight $(t_f)$ of said first reflected pulse $R_1$;

g. repeating steps d, e and f for each of said plurality of reflected pulses $R_1$ to $R_N$;

h. combining said time-of-flight measurements $(t_{fAVG})$ for each of the plurality of reflected pulses $R_1$ to $R_N$;

i. calculating D using the relationship $D=S(t_{fAVG})$ where S is the speed of sound;

j. repeating steps c to i for each of the plurality of pulses $[P_1$ to $P_N]$; and, k. calculating an average value D from each value of D calculated in step i for each of the plurality of pulses $[P_1$ to $P_N]$.

3. The method of claim 2 wherein the highest allowable frequency $f_{HIGH}$ of a pulse of sonic acoustic energy is determined by the relationship $f_{HIGH}=S/3\theta$ where S is the speed of sound and θ is the inside diameter of the well.

4. The method of claim 3 wherein the lowest allowable frequency $f_{LOW}$ of said pulse of sonic acoustic energy is determined by the relationship $f_{LOW}=SW/2D_{MIN}$ wherein S is the speed of sound and W is the vibration factor of the sonic pulse emitter.

5. The method of claim 4, wherein an emission frequency f is chosen between $f_{LOW}$ and $f_{HIGH}$.

6. A method of measuring the level of the surface of water in a ground water well having obstructions using a sonic acoustic pulse emitter having a vibration factor (W) and a pulse receiver as a function of the distance D between surface of water, wherein said well has an axis and an inside diameter (θ) said method comprising the steps of:

a. transmitting a first pulse of sonic acoustic energy having a frequency $f_1$ down said axis of said well thereby creating a plurality of first reflected pulses $R^1{}_1$ to $R^1{}_N$;

b. receiving at the sonic receiver a first reflected pulse $R^1{}_1$ of said plurality of first reflected pulses $R^1{}_1$ to $R^1{}_N$;

c. measuring the time-of-flight $(t^1{}_{f1})$ of said reflected pulse $R^1{}_1$;

d. repeating steps b and c for each of the subsequent reflected pulses $R^1{}_2$ to $R^1{}_N$;

e. recording the time-of-flight measurements $t^1{}_{f2-N}$ for each of the plurality of first reflected pulses $R^1{}_2$ to $R^1{}_N$;

f. calculating the average time-of-flight measurement $(t^1{}_{favg})$; and g. calculating a first value for $D_1$ using the relationship $D_1=S(t^1{}_{favg})/2$ where S is the speed of sound.

7. The method of claim 6 wherein said first pulse of sonic energy comprises a plurality of first pulses of sonic energy all having a frequency $f_1$ and wherein the duration of said plurality of first pulses is sufficiently short to avoid interference with reflected pulses.

8. The method as claimed in claim 6, further comprising the steps of a. establishing a plurality receive windows $WIN_1$ to $WIN_N$ associated with the measured time-of-flight of each of the plurality of first reflected pulses $R^1{}_1$ to $R^1{}_N$;

b. transmitting a second pulse of sonic acoustic energy having a frequency $f_2$ down the axis of the well thereby creating a plurality of second reflected pulses $R^2{}_1$ to $R^2{}_N$ and wherein said second sonic pulse has a frequency $f_2$ higher than the frequency of the first sonic pulse $f_1$;

c. receiving a first reflected pulse $R^2{}_1$ in $WIN_1$ of said plurality of second reflected pulses;

d. rejecting any of said second reflected pulses $R^2{}_1$ to $R^2{}_N$ having a time-of-flight falling outside of $WIN_1$ to $WIN_N$;

e. recording the time-of-flight measurements $t^2{}_{f1}$ for $R^2{}_1$;

f. repeating steps c, d and e for each of plurality of second reflected pulses $R^2{}_2$ to $R^2{}_N$ so as to obtain $t^2{}_{f2-N}$;

g. calculating the average time-of-flight measurement $(t^2{}_{favg})$; and, h. calculating a second value for $D_2$ using the relationship $D_2=S(t^2 f_{avg})/2$.

9. The method of claim 8 wherein said second pulse of sonic energy comprises a plurality of second pulses of sonic energy all having a frequency $f_2$ and wherein the duration of said plurality of second pulses is sufficiently short to avoid interference with reflected pulses.

10. The method of claim 9 further including after step 13b, a step wherein the amplitude of each of the plurality of second reflected pulses $R^2{}_1$ to $R^2{}_N$ is compared to threshold amplitude $A_{LIM}$ and wherein second reflected pulses having an amplitude less than $A_{LIM}$ are ignored.

11. The method of claim 10 wherein the highest allowable frequency $f_{1HIGH}$ of the first sonic pulse of sonic acoustic energy is determined by the relationship $f_{1HIGH}=S/3\theta$ where S is the speed of sound and θ is the inside diameter of the well.

12. The method of claim 11 wherein the lowest allowable frequency $f_{1LOW}$ of the first pulse of sonic acoustic energy is determined by the relationship $f_{1LOW}=SW/2D_{MIN}$ wherein S is the speed of sound and W is the vibration factor of the sonic pulse emitter.

13. The method of claim 12, wherein $f_1$ of the first sonic pulse is chosen between $f_{1LOW}$ and $f_{1HIGH}$.

14. The method of claim 13, wherein $f_2$ of the second pulse of sonic acoustic energy is determined by the relationship $f_2=S/2\theta$ where S is the speed of sound and θ is the diameter of the well.

15. An acoustic distance measuring device for measuring the level of water in a ground water well having obstructions, wherein said well has an axis, a diameter ($\theta$) and a water level measured as a function of the distance (D) from said device to said water level, wherein said distance D varies between $D_{MAX}$ and $D_{MIN}$, and further wherein said acoustic distance measuring device comprises:

a. an electrical circuit adapted to generate an electrical signal having an initial amplitude ($A_i$) and a frequency (f);

b. a sonic pulse emitter coupled to said electric circuit and adapted to convert said electric signal into a sonic pulse having a frequency (f) and an amplitude $A_i$ wherein, said sonic pulse emitter is co-axial with the ground water well and has a vibration factor W, and further wherein the sonic pulse emitter is adapted and oriented to emit a sonic pulse down the axis of the ground water well thereby creating a series of successive reflected cycles up and down the groundwater well comprising reflected pulses $R_1$–$R_N$ having amplitudes $A_{R1}$ to $A_{RN}$;

c. a sonic pulse receiver proximate to said sonic pulse emitter, wherein said sonic pulse receiver is adapted and oriented to receive said reflected pulses $R_1$–$R_N$ from the surface of the water and wherein said sonic pulse receiver is adapted to generate electrical signals having strengths relative to the amplitudes $A_{R1}$ to $A_{RN}$ of the reflected sonic pulses;

d. a comparator circuit connected to the sonic pulse receiver for comparing the amplitudes $A_{R1}$ to $A_{RN}$ of the reflected pulses $R_1$–$R_N$ with a predetermined threshold value $A_{LIM}$, wherein said comparator is adapted to reject any amplitudes falling below $A_{LIM}$, and further wherein the comparator is adapted to convert analogue signals to digital signals for transmission to;

e. a microprocessor connected to a programmable memory storing operating and application programs, wherein the microprocessor is adapted to execute said programs to calculate the average time-of-flight ($t_{fAVG}$) of each of the successive reflected cycles having $A_{R1}$ to $A_{RN}$ greater than $A_{LIM}$ and times of flight $t_1$ to $t_N$ from the sonic pulse emitter to the water in the ground water well and back to the sonic pulse receiver, and wherein said microprocessor is further adapted to calculate said distance (D) according to the relationship $D=S(t_{fAVG})/2$ where S is the speed of sound and wherein $t_{fAVG}=(\Sigma^{n1}_{tN}/N)$.

16. A method of using an acoustic distance measuring device for measuring the level of water in a ground water well having obstructions, wherein said well has an axis, a diameter ($\theta$) and a water level measured as a function of the distance (D) from said device to said water level, and wherein said distance D varies between $D_{MAX}$ and $D_{MIN}$, and further wherein said acoustic distance measuring device comprises an electrical circuit adapted to generate an electrical signal of having an initial amplitude ($A_i$) and a frequency (f); a sonic pulse emitter coupled to said electric circuit and adapted to convert said electric signal into a sonic pulse having a frequency (f) and an amplitude $A_i$ wherein said sonic pulse emitter is co-axial with the ground water well and has a vibration factor W; and further wherein the sonic pulse emitter is adapted and oriented to emit a sonic pulse down the axis of the ground water well thereby creating a plurality of reflected pulses $R_1$–$R_N$; a sonic pulse receiver proximate to said sonic pulse emitter, wherein said sonic pulse receiver is adapted and oriented to receive said reflected pulses $R_1$–$R_N$ each having an amplitude $A_{R1}$ to $A_{RN}$ respectively, and wherein said sonic pulse receiver is adapted to generate an electrical signal having a strength relative to the amplitude $A_{R1}$ to $A_{RN}$ of the reflected sonic pulses; a comparator circuit connected to the sonic pulse receiver for comparing the amplitude $A_{R1}$ to $A_{RN}$ of the received reflected sonic pulse with a predetermined threshold value $A_{LIM}$, wherein said comparator is adapted to reject any amplitude below $A_{LIM}$, and further wherein the comparator is adapted to convert analogue signals to digital signals for transmission to; a microprocessor connected to a programmable memory storing operating and application programs, wherein the microprocessor adapted to execute said programs to calculate the time-of-flight ($t_f$) of each of the emitted sonic pulses, and wherein said microprocessor is further adapted to calculate said distance (D) according to the relationship $D=S(t_f)/2$ where S is the speed of sound, said method comprising the following steps:

a. programming said application software by inputting values for W, $\theta$, $D_{MIN}$, $D_{MAX}$ and $A_{LIM}$;

b. selecting a mode of operation;

c. calculating the low range of a first frequency $f_{1LOW}$ of a first sonic pulse to be emitted by the sonic pulse emitter;

d. calculating the high range of a first frequency $f_{1HIGH}$ of said first sonic pulse to be emitted by the sonic pulse emitter;

e. selecting a first sonic pulse frequency $f_1$ for the first sonic pulse between $f_{1LOW}$ and $f_{1HIGH}$; and, f. selecting amplitude $A_i$ for the first sonic pulse.

17. The method of claim 16, wherein the step of selecting the mode of operation comprises the step of selecting one of the following modes of operation: automatic measurements per second; automatic measurements per minute; and, automatic measurements per hour.

18. The method as claimed in claim 17, wherein the step of calculating $f_{1LOW}$ of a first sonic pulse to be emitted by the sonic pulse emitter is based on the relationship $f_{1LOW}=SW/2D_{MIN}$ where S is the speed of sound, W is the vibration factor of the sonic emitter and $D_{MIN}$ is the minimum distance to be measured between the inside surface of the well cap and the level of water in the well.

19. The method as claimed in claim 18, wherein the step of calculating $f_{1HIGH}$ of said first sonic pulse to be emitted by the sonic pulse emitter is based on the relationship $f_{1HIGH}=S/3\theta$ where S is the speed of sound and $\theta$ is the diameter of the well.

20. The method as claimed in claim 19, wherein the step of selecting a first sonic pulse frequency $f_1$ for the emission between $f_{1LOW}$ and $f_{1HIGH}$ is accomplished by the application software.

21. The method as claimed in claim 20, wherein the step of selecting an amplitude A for the first sonic pulse is accomplished by the application software and is dependent upon $D_{MAX}$ so that the emitted first sonic pulse will have sufficient strength to reach $D_{MAX}$ and reflect back to the sonic pulse receiver.

22. The method of claim 21, further comprising the steps of:

a. correcting the value for the speed of sound S for ambient conditions within the well;

b. initiating a first excitation signal having a frequency $f_1$;

c. emitting a first sonic pulse from the sonic pulse emitter wherein said first sonic pulse has a frequency equal to $f_1$ and an amplitude equal to $A_i$ and wherein the first sonic pulse is adapted to travel down the axis of the well to the surface of water in the well, reflect off of the surface and travel back to the sonic pulse receiver thereby creating a plurality of first reflected pulses $R^1_1$ to $R^1_N$ each having an amplitude $A_{R1-N}$ respectively;

d. detecting said first sonic pulse at the sonic pulse receiver and establishing the time at which the emitted sonic pulse is detected as $t_0$;

e. detecting a first reflected pulse $R^1_1$ of said plurality of first reflected pulses wherein said first reflected pulse has an amplitude $A^1_{R1}$ and establishing the time at which $R^1_1$ is detected as $t^1_1$;

f. comparing $A^1_{R1}$ with $A_{LIM}$ wherein $R^1_1$ is rejected when $A^1_{R1}$ is less than $A_{LIM}$ and wherein $R^1_1$ is accepted when $A^1_{R1}$ is greater than or equal to $A_{LIM}$; and, g. repeating steps e and f for reflected pulses $R^1_2$ to $R^1_N$.

23. The method of claim 22 wherein said first pulse of sonic energy comprises a plurality of pulses of sonic energy all having a frequency $f_1$ and wherein the duration of said plurality of pulses is sufficiently short to avoid interference with reflected pulses.

24. The method of claim 23, further comprising the steps of:

a. calculating the time-of-flight $t_f$ for each reflected pulse $R^1_1$ to $R^1_N$;

b. calculating a combined time-of-flight $t^1_{AVG}$; and, c. calculating a first value for $D_1$ according to the relationship $D_1 = S(t^1_{AVG})/2$ where S is the speed of sound.

25. The method of claim 24, further comprising the steps of:

a. establishing receive windows $WIN_1$ to $WIN_N$ based on said time-of-flight calculations for each reflected pulse $R^1_1$ to $R^1_N$;

b. calculating a second frequency $f_2$ for a second sonic pulse wherein said second frequency $f_2$ is higher than the first frequency $f_1$ and is calculated according to the relationship $f_2 = S/2\theta$ where S is the speed of sound and $\theta$ is the diameter of the well;

c. emitting said second sonic pulse having frequency $f_2$ thereby creating a plurality of second reflected pulses $R^2_1$ to $R^2_N$;

d. detecting said second sonic pulse at the sonic pulse receiver and establishing $t_0$;

e. detecting first reflected pulse $R^2_1$ of said plurality of second reflected pulses $R^2_1$ to $R^2_N$ in $WIN_1$ and establishing $t^1_1$;

f. accepting $R^2_1$ when $A^2_{R1}$ is greater than $A_{LIM}$;

g. calculating a time-of-flight $t^2_{f1}$ for $R^2_1$;

h. repeating steps e, f and g for each subsequent reflected pulse $R^2_2$ to $R^2_N$;

i. calculating an average time-of-flight $t^2_{AVG}$;

j. calculating a second value for distance $D_2$ based on the relationship $D_2 = S(t^2_{AVG})/2$ where S is the speed of sound; and, k. displaying the second calculated value of $D_2$.

26. The method of claim 25 wherein said second pulse of sonic energy comprises a plurality of pulses of sonic energy all having a frequency $f_2$ and wherein the duration of said plurality of second pulses is sufficiently short to avoid interference with reflected pulses.

* * * * *